United States Patent Office 2,985,684
Patented May 23, 1961

2,985,684

POLYHALOGENATED COMPOUNDS AND
METHOD OF PREPARATION

Charles J. Pennino, Hudson, Ohio, assignor to The B. F.
Goodrich Company, New York, N.Y., a corporation
of New York No Drawing. Filed June 25, 1954, Ser. No. 439,479

20 Claims. (Cl. 260—479)

This invention relates to new and useful polyhalogenated diene acids, salts and esters and to their methods of preparation and more particularly refers to heptahalohexadiene-2,5-oic acids, salts and esters thereof and to methods for preparing the compounds by alkaline scission of a polyhalocyclohexene-2-one-1 ring.

An object of the invention is the provision of unsaturated aliphatic acids, salts and esters in which the carbon atoms of the acid other than the carboxyl carbon contain only halogen substituents. Another object is the provision of halogenated, non-conjugated, dieneoic aliphatic acids, salts or esters in which the carboxylic acid moiety has six carbon atoms and in which the carbon atoms other than the carboxyl carbon contains only halogen substituents. Still another object is the method of preparation of the novel halogenated aliphatic acids by alkaline scission of an octahalogenated cyclohexene-2-one-1.

These and numerous other objects are accomplished by this invention of which the following detailed description is a preferred embodiment.

It is extremely difficult to prepare unsaturated haloaliphatic compounds by direct halogenation because of the well-known tendency of halogen to add to carbon-to-carbon unsaturation in preference to substitution. Fully halogenated, saturated organic compounds can be prepared by exhaustive halogenation and these saturated halo compounds can be pyrolyzed in some instances to form unsaturated derivatives, and in other cases they may be treated with a material such as zinc dust to strip halogen atoms from the molecule. Another method of preparing halogenated unsaturated compounds is by dehydrohalogenation of compounds containing both halogen and hydrogen atoms on adjacent carbon atoms of the molecule. All of these methods usually result in the formation of complex mixtures of compounds which are extremely difficult to separate and in which no one particular compound is present in satisfactorily high proportions. This difficulty is largely due to the impossibility of controlling the reaction along the desired route, so that the end products will be predominantly of one chemical structural configuration. I have discovered that exceptionally good yields of heptahalohexadiene-2,5-oic acids, their salts and esters, can be produced by alkaline scission of octahalocyclohexen-2-one-1. The heptahalohexadiene-2,5-oic acids, their salts and esters are new compounds which have important uses which shall be described hereinafter. My new compounds are prepared in accordance with the following graphic equation:

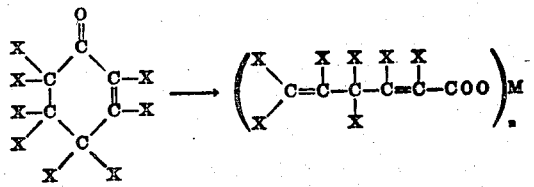

where X represents a halogen, particularly chlorine or bromine, M represents hydrogen, an alkali metal, an alkaline earth metal, an alkyl group or an aryl group, and $n$ is equal to the valence of M.

The reaction proceeds in aqueous media in the presence of alkali or alkaline earth metal hydroxides, alkali metal oxides, carbonates, or bicarbonates to produce salts of the heptahalogenated hexadiene-2,5-oic acids. Specific inorganic alkaline compounds which may be used for producing the alkaline scission include lithium, sodium, potassium and cesium hydroxides, oxides, carbonates and bicarbonates and calcium, magnesium and strontium hydroxides. Dilute alkaline solutions having from about 2 to 15% by weight of sodium hydroxide or its alkali equivalent can be used for effecting the reaction.

In those instances where inorganic alkaline materials in aqueous solution are employed as the ring opening compounds, the reaction proceeds most favorably at temperatures of from about 5° C. to about 50° C., but average temperatures of from 20° to 30° C. are preferred, since undesirable side reactions are at a minimum under these conditions. The time necessary for completing the reaction in aqueous media will vary from about 2 to 8 days depending in part on the alkali used and the concentration of the alkaline material in the reaction medium.

The scission can also be carried out in liquid phase in organic media containing little or no water for direct preparation of esters. In such cases it is preferable to use organic, solvent-soluble, alkali metal salts of the lower carboxylic acids in which the carbon atom other than the carboxy group have only hydrogen substituents. They include the sodium, potassium or lithium salts of formic acid, acetic acid, propionic acid, butyric acid, isobutyric acid the pentanoic acids and the like.

The reaction conditions in substantially anhydrous media, where salts of organic carboxylic acids supply the necessary alkalinity, can be more severe than those of the aqueous reaction and can be run at temperatures ranging from aboput 5° C. to reflux temperature of the reaction mixture which can be as high as about 150° C. When running the reaction in organic media it is desirable to use a diluent in which the octahalocyclohexenone and the salt of the carboxylic acid are both soluble in sufficient concentration to provide good yields and an adequate amount of end product per batch. Diluents of this type are dioxane or other ethers. Lower molecular weight alcohols which are liquid at room temperature and liquid, ether alcohols, especially those of ethylene glycol, such as ethylene glycol monomethyl, monoethyl and monobutyl ethers, known as "Sellosolves" are reactants and will form esters of the heptahalodieneoic acids in substantially anhydrous media, but if an excess of these compounds is used, the unreated portion serves as a diluent. The diluents can be mixed or blended with benzene and other liquid aromatic hydrocarbons or liquid halogenated hydrocarbons.

Metal salts of heptahalodieneoic acids of this invention are prepared during the alkaline scission of an octahalocyclohexene-2-one-1 ring in the presence of large proportions of water in the diluent. The salts are only partially soluble in water and can be separated from the reaction medium in fair yield by filtration. The free acid can be readily recovered by acidifying either a water solution or a water suspension of the salts, or by acidifying the reaction mixture and extracting the acid with a water-immiscible organic solvent. The solvents include benzene, toluene, xylene, halogenated hydrocarbons, ethers and the like.

The esters of this invention can be prepared directly, without going through the salt or free acid stage, by carrying out the reaction in a substantially anhydrous medium in the presence of a low molecular weight alcohol and a salt of a lower molecular weight carboxylic acid as the ring splitting agent. By this means alkyl esters can be made directly. The esters include those of methyl, ethyl, propyl, butyl, amyl, hexyl and octyl alcohols.

The reaction proceeds with a wide variety of octahalocyclohexen-2-ones, including such compounds as 2,3,4,4,5,5,6,6-octachlorocyclohexen-2-one-1; 2,3,4,4,5,5,6,6-octabromocyclohexen-2-one-1; 2,4,6-tribromo-3,4,5,5,6-pentachlorocyclohexen-2-one-1; 2,4,6-trichloro-3,4,5,5,6-pentabromocyclohexen-2-one-1 and other octahalogenated derivatives of cyclohexen-2-ones containing chlorine and bromine.

A mechanism of reaction is proposed but is not intended to state positively the course of the complex reaction. It is believed that in aqueous alkaline media there is a nucleophilic attack on the carbonyl group of the octahalocyclohexen-2-one-1 with ring cleavage and elimination of a chloride ion to form a terminally unsaturated linkage. Graphically the reaction may proceed as follows:

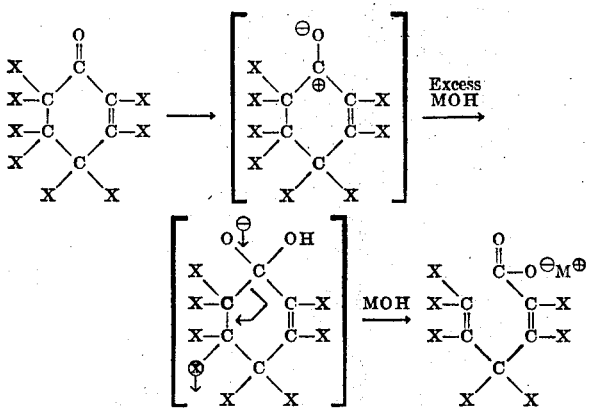

Upon opening of the ring, the molecule becomes stabilized and does not react further with alkaline materials in the reaction medium at a temperature below about 50° C. It is also believed that the course followed in the formation of the ester is similar to that which occurs in the salt formation with the exception, however, that an intermediate acid anhydride is formed between the carbonyl group and the appropriate anion of the alkali metal salt of the carboxylic acid. The acid anhydride, in turn, reacts with the alcohol to produce the ester.

The yields from these reactions are unusually high and vary from about 80% to about 97%, based on the octahalocyclohexen-2-one-1 that has reacted.

The heptahalohexadiene-2,5-oic acids, their salts and esters have outstanding properties in that the salts themselves show very high fungicidal and bactericidal activity and a comparatively low phytotoxicity as compared with the parent octahalocyclohexenone. The esters on the other hand, in addition to being outstanding fungicides, bactericides and algicides are also exceptional herbicides. These two important biological properties can be readily controlled by proper selection of the reacting ingredients, depending upon the use for which they are intended. The phytotoxicity and microbiological activity of octachlorocyclohexenone is described in U.S. Patent 2,657,126, issued October 27, 1953.

The following specific examples are intended to show the nature of the invention without limiting it to the example themselves. All instances are by weight unless specifically indicated otherwise.

Example I

Twenty-five parts of 2,3,4,4,5,5,6,6-octachlorocyclohexen-2-one-1, having a melting point of 101-3° C., were mixed with 100 ml. of 2-N sodium hydroxide at room temperature (20 to 30° C.) and stirred for seven days. Thereafter the reaction mixture was cooled in an ice bath and filtered. The solid residue was washed with ice water and dried. The resulting white crystalline powder was present in a yield of 86.5% based on the octachlorocyclohexenone. This white, crystalline powder was the sodium salt of 2,3,4,4,5,6,6-heptahalohexadiene-2,5-oic acid. On acidification the free acid was produced. When crystallized from benzene solution this acid had a melting point of 135-7.5° C. On analysis it was found to contain the following elemental composition:

|  | Carbon | Hydrogen | Chlorine |
|---|---|---|---|
| Theory | 20.36 | 0.28 | 70.29 |
| Found | [1] 20.23 | [1] 0.55 | [1] 70.52 |

[1] Average.

Example II

The methyl ester of 2,3,4,4,5,6,6-heptachlorohexadiene-2,5-oic acid was prepared directly by mixing 25 parts by weight of the octahalocyclohexenone, described under Example I, and 44 parts by weight of sodium acetate, with 75 parts of dioxane and 150 parts by volume of methanol. This reaction mixture was heated to reflux temperature and held at that point for about 4½ hours. Upon cooling the reaction mixture by pouring it into ice water an oily liquid separated from the water. This oily liquid crystallized slowly and was thereafter filtered to separate all other fluid materials, washed with water and dried. A yield of 95% based on the octachlorocyclohexenone was obtained. The methyl ester when crystallized from methyl alcohol had a melting point of from 44-45° C.

Example III

A procedure identical with that under Example II, with the exception of the temperature and proportions of reacting ingredients, was followed. In this particular instance, the reaction was held at room temperature for twenty-four hours. 93 parts of the octachlorocyclohexenone were mixed with 44 parts sodium acetate. A 95% yield of ester of 2,3,4,4,5,6,6-heptachlorohexadiene-2,5-oic acid having a melting point of 43-45° C. was produced at the end of this time. In the following table are the results of additional experiments in which the ratio of octachlorocyclohexen-2-one to sodium acetate was varied and in which the total time of the reaction ran from about three hours to about twelve hours.

| Parts Octachlorocyclohexenone | Molar ratio of octachlorocyclohexenone to sodium acetate | Temp. | Time | Percent Yield | M.P. of ester, °C. |
|---|---|---|---|---|---|
| 25 | 1 to 6 | Room Temp. | 3 hrs. | 81 | |
| 60 | 1 to 8 | do | 4 hrs. | 91 | 40-2 |
| 93 | 1 to 8 | do | overnight | 97 | 41-2 |

The melting point of the crude material from the last experiment mentioned above was 41-42° C. and upon recrystallization from ethanol it had an M.P. of 45-46° C. Upon analysis, this compound was shown to contain the following percentages of the ingredients listed.

|  | Carbon | Hydrogen | Chlorine |
|---|---|---|---|
| Calculated for $C_7H_3Cl_7O_2$ | 22.82 | 0.81 | 67.61 |
| Found | [1] 22.85 | [1] 1.04 | [1] 66.96 |

[1] Average.

Example IV 37.2 parts of octachlorocyclohexen-2-one-1, having the structure described in Example I, were mixed with 52.4 parts by weight of sodium formate, 75 parts dioxane and 150 parts of methanol by volume. This reaction was run at reflux temperature and yielded 55% of the methyl ester of 2,3,4,4,5,6,6-heptachlorohexadiene-2,5-oic acid having a melting point of 41–43° C. and a boiling point of from 125 to 130° C. at 0.5 mm.

Example V

In another test a molar ratio of octachlorocyclohexenone to sodium propionate of 1 to 4.2 was prepared by blending 20 parts of octachlorocyclohexenone to two parts by weight of sodium propionate, 30 parts of dioxane and 70 parts by volume of methanol. The reaction was run under reflux for 3 hours and yielded 61% of a crystalline product having a melting point of 42–44° C. and a boiling point of 128 to 132° C. at 0.5 mm. In order to determine whether there was any difference between the methyl esters produced from the mixtures containing, respectively, sodium acetate and sodium propionate, equal amounts of the crystalline material from each reaction were dissolved in ethyl alcohol and recrystallized. The recrystallized material had a melting point of 42.5–44.5° C. The methyl ester was further identified by mixing a portion thereof with 2–N sodium hydroxide and allowing the mixture to stand for seven days. Thereafter, the reaction mixture was cooled and filtered and the filtrate was acidified. The crystallized precipitate had a melting point of 135–137° C. and when recrystallized from benzene had a melting point from 136 to 137.5° C. The free acid was also analyzed and was found to have the following percentages of ingredients.

|  | Carbon | Hydrogen | Chlorine |
|---|---|---|---|
| Theory for $C_6H_7Cl_7O_2$ | 20.36 | 0.28 | 70.29 |
| Found | ¹20.23 | ¹0.58 | ¹68.63 |

¹ Average.

A mixed melting point made by taking equal quantities of the purified acid from Example I and the recrystallized acid from the methyl ester showed no depression in that the M.P. of the mixture was 135.5–7° C.

Example VI

Ten parts by weight of 2,3,4,4,5,5,6,6-octachlorocyclohexen-2-one-1 and 25 parts by weight of sodium acetate were added to a mixture containing 30 parts of dioxane and 50 parts of ethanol by volume. This reaction mixture was heated to reflux temperature and held at that point for 4 hours. The reaction mixture was then poured into cold water at which time an oily layer separated. The oily phase was dissolved in ether, washed with water and dried. The ether was then removed by distillation, leaving 8.3 parts of an oily residue. The oil distilled at 125–130° C. under a reduced pressure of 0.1 mm.

On analysis of the ethyl ester produced by this reaction the results were in good agreement with the theoretical values for a compound having the empirical formula $C_8H_5Cl_7O_2$.

Calculated: C, 25.11%; H, 1.31%. Found: C, 25.26%; H, 1.46%.

The remaining octahalocyclohexenones mentioned herein will produce equivalent heptahalo hexadieneoic acids and derivatives thereof when reacted in accordance with the procedures and under the conditions described herein. By this means it is possible to produce halogenated non-conjugated diene aliphatic acids in which the carbon atoms other than the carboxyl containing carbon atom contain only halogen substituents. These halogens can be chlorine or bromine. It is evident that the end product can be readily controlled by properly selecting the starting material, since it has been shown that one halogen atom is removed from the number five carbon atom of the octahalocyclohexenone and the remainder of the cyclohexenone molecule remains intact. The final chemical structure can be predicted with fair certainty and, therefore, if one desires a completely halogenated unsaturated hexadieneoic acid it is necessary only to substitute halogen at the proper position on the raw product and then react it in accordance to the teachings of this invention.

Esters can be prepared from the heptahalohexadiene-2,5-oic acid by the indirect process of first isolating the free acid, converting the acid to the acid halide by reaction with $PCl_5$, $PBr_5$ or $SOCl_2$ and then reacting the acid halide with an alcohol or a phenol.

Example VII

The acid chloride of 2,3,4,4,5,6,6-heptachlorohexadiene-2,5-oic acid was made by reacting 10 parts of the acid with 9 parts of $PCl_5$ under reflux for 3 hours. Volatile by-products were removed under a slight vacuum and the residual oily acid chloride was distilled at a temperature of about 120° C. and a pressure of 1 mm. to yield 11 g. of the acid chloride.

Two parts of the acid chloride were reacted with an excess of allyl alcohol containing a small amount of pyridine. After the reaction was complete the mixture was washed with water and an 2.6 parts of an oily product separated. This oily material was distilled at 130° C.–140° C. and 0.3 mm. pressure to yield 1.6 parts of an oily ester.

Analysis.—Calculated for $C_9H_5Cl_7O_2$: C, 27.44; H, 1.27. Found: C, 27.43 (av.); H, 1.17 (av.).

Example VIII

Six parts of the acid chloride described under Example VII were reacted with an excess (10 parts) of phenol in the presence of a trace of pyridine. An oily liquid was isolated which formed crystals from a hexane solution. The phenyl ester, when recrystallized from methanol had an M.P. of 62–3° C.

Analysis.—Calculated for $C_{12}H_5Cl_7O_2$: C, 33.52; H, 1.16. Found: C, 33.43 (av.); H, 1.38 (av.).

Example IX

Methyl 2,3,4,4,5,6,6 - heptachlorohexadiene - 2,5 - oate was prepared by reacting the acid chloride and an excess of methanol containing a trace of pyridine. The yield was substantially quantitative. The ester had an M.P. of 43–45° C. and a mixed melting point taken with the ester formed by the reaction of octachlorocyclohexenone and methanol in the presence of sodium acetate had an M.P. of 43–44° C.

Having described my invention in detail it is obvious that numerous modifications thereof are possible and I do not intend to limit myself to the description but only by the claims which are appended hereto.

I claim:
1. A composition having the generic formula

$$\left( \begin{array}{c} X \\ \diagdown \\ \diagup \\ X \end{array} C = \overset{X}{\underset{\phantom{X}}{C}} - \overset{X}{\underset{X}{C}} - \overset{X}{\underset{\phantom{X}}{C}} = \overset{X}{\underset{\phantom{X}}{C}} - COO \right)_n M$$

in which X represents a halogen selected from the class consisting of chlorine and bromine, M is selected from the class consisting of hydrogen, an alkali metal, a lower aliphatic hydrocarbon group, and a monocyclic aryl group and $n$ is an integer equal to the valence of M.

2. The composition of claim 1 in which X represents chlorine.

3. Heptachlorohexadiene-2,5-oic acid.

4. Heptabromohexadiene-2,5-oic acid.

5. Methyl 2,3,4,4,5,6,6 - heptachlorohexadiene - 2,5 - oate.

6. Ethyl 2,3,4,4,5,6,6 - heptachlorohexadiene - 2,5 - oate.

7. Allyl 2,3,4,4,5,6,6 - heptachlorohexadiene - 2,5 - oate.

8. Phenyl 2,3,4,4,5,6,6 - heptachlorohexadiene - 2,5 - oate.

9. A method of preparing alkali metal salts and lower alkyl esters of heptahalohexadiene-2,5-oic acid comprising reacting an octahalocyclohexene-2-one-1 in which the halogen is selected from the class consisting of chlorine and bromine with a member selected from the class consisting of alkali metal hydroxides, oxides, carbonates, bicarbonates and alkali metal salts of lower aliphatic carboxylic acids to cause scission of the cyclohexene ring, said alkali metal salts of heptahalohexadiene-2,5-oic acid being formed by carrying out said reaction in an aqueous medium at a temperature not substantially higher than 60° C. and said esters being formed by carrying out said reaction under substantially anhydrous conditions with said alkali metal salts of lower aliphatic carboxylic acids in the presence of a lower alkanol.

10. A method of preparing alkali metal salts of heptahalohexadiene-2,5-oic acid in which the halogen is selected from the class consisting of chlorine and bromine comprising reacting the corresponding octahalocyclohexadiene-2-one-1 with an aqueous alkali metal hydroxide containing at least 2% by weight of the hydroxide in the presence of water at a temperature not substantially higher than 60° C.

11. The method of claim 10 in which the alkaline material is an alkali metal hydroxide present in a concentration of from about 2 to 15 percent by weight, and the temperature range is from about 20 to about 30° C.

12. The method of claim 11 in which the hydroxide is sodium hydroxide.

13. A method of preparing esters of a straight chain heptahalohexadiene-2,5-oic acid comprising reacting an octahalocyclohexene-2-one-1 in which the halogen is selected from the class consisting of chlorine and bromine with an alkali metal salt of a saturated aliphatic acid having from 1 to 5 carbon atoms in a substantially anhydrous medium in the presence of a liquid alcohol at a temperature up to the reflux temperature of the mixture.

14. The method of claim 13 in which the salt of the acid is sodium formate.

15. The method of claim 13 in which the salt of the acid is sodium acetate.

16. The method of claim 13 in which the salt of the acid is sodium propionate.

17. The method of claim 10 in which the octahalocyclohexene-2-one-1 is octachlorocyclohexene-2-one-1.

18. The method of claim 10 in which the octahalocyclohexene-2-one-1 is octabromocyclohexene-2-one-1.

19. The method of claim 15 in which the octahalocyclohexene-2-one-1 is octachlorocyclohexene-2-one-1.

20. The method of claim 13 in which the octahalocyclohexene-2-one-1 is octabromocyclohexene-2-one-1.

References Cited in the file of this patent

UNITED STATES PATENTS 2,533,134    McBee et al. _____ Dec. 5, 1950

OTHER REFERENCES

Zincke et al.: Ber. Deut. Chem., v. 25 (1892), page 2694.